United States Patent
Heap

(10) Patent No.: US 11,162,804 B2
(45) Date of Patent: Nov. 2, 2021

(54) METHOD AND SYSTEM FOR ROUTE DETERMINATION BASED ON A VEHICLE AND PROPULSION SYSTEM CHARACTERIZATION

(71) Applicant: GM Global Technology Operations LLC, Detroit, MI (US)

(72) Inventor: Anthony H. Heap, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 154 days.

(21) Appl. No.: 16/597,353

(22) Filed: Oct. 9, 2019

(65) Prior Publication Data

US 2020/0124432 A1  Apr. 23, 2020

Related U.S. Application Data

(60) Provisional application No. 62/747,352, filed on Oct. 18, 2018.

(51) Int. Cl.
*G01C 21/34* (2006.01)
*G05D 1/02* (2020.01)

(52) U.S. Cl.
CPC ..... *G01C 21/3469* (2013.01); *G01C 21/3492* (2013.01); *G05D 1/0217* (2013.01)

(58) Field of Classification Search
CPC .......................... G01C 21/3469; G05D 1/0217
See application file for complete search history.

(56) References Cited

U.S. PATENT DOCUMENTS

| | | | |
|---|---|---|---|
| 2007/0112475 A1 | 5/2007 | Koebler et al. | |
| 2008/0319597 A1 | 12/2008 | Yamada | |
| 2011/0160993 A1* | 6/2011 | Tsurutani | G01C 21/3469 701/532 |
| 2011/0246004 A1* | 10/2011 | Mineta | B60W 20/11 701/22 |
| 2011/0307166 A1* | 12/2011 | Hiestermann | G01C 21/3469 701/119 |
| 2011/0313647 A1* | 12/2011 | Koehler | G01C 21/3617 701/123 |
| 2012/0010767 A1 | 1/2012 | Phillips et al. | |
| 2012/0010768 A1* | 1/2012 | Phillips | B60L 50/16 701/22 |
| 2014/0046595 A1* | 2/2014 | Segawa | G01C 21/34 701/541 |
| 2014/0278103 A1 | 9/2014 | Daikoku | |

(Continued)

*Primary Examiner* — Khoi H Tran
*Assistant Examiner* — Tristan J Greiner
(74) *Attorney, Agent, or Firm* — Cantor Colburn LLP

(57) ABSTRACT

In an exemplary embodiment, a method for determining a route using route segment characterizations is disclosed. The method includes receiving, by a processor, a destination. The method further includes determining, by the processor, one or more routes to the destination from a first location. The method further includes dividing, by the processor, each of the one or more routes into one or more route segments. The method further includes characterizing, by the processor, each of the one or more route segments according to propulsion resources available to a vehicle. The method further includes providing, by the processor, an optimized route from the one or more routes based on the characterization of the one or more route segments.

15 Claims, 10 Drawing Sheets

(56) References Cited

U.S. PATENT DOCUMENTS

| | | |
|---|---|---|
| 2015/0066270 A1 | 3/2015 | Ogawa |
| 2015/0232097 A1 | 8/2015 | Luther et al. |
| 2015/0251557 A1* | 9/2015 | Ota .................. B60L 58/12 |
| | | 702/158 |
| 2017/0370738 A1 | 12/2017 | Park et al. |
| 2018/0231389 A1* | 8/2018 | De Nunzio .......... B60W 50/14 |
| 2018/0281620 A1 | 10/2018 | Ourabah et al. |
| 2019/0113354 A1 | 4/2019 | Matsumura et al. |
| 2020/0108829 A1 | 4/2020 | Bauer et al. |
| 2020/0116516 A1* | 4/2020 | Kim .................. B60L 58/12 |

* cited by examiner

METHOD AND SYSTEM FOR ROUTE DETERMINATION BASED ON A VEHICLE AND PROPULSION SYSTEM CHARACTERIZATION

CROSS REFERENCE TO RELATED APPLICATION

This application claims the benefit of U.S. Provisional Patent Application Ser. No. 62/747,352 filed Oct. 18, 2018 which is incorporated herein by reference in its entirety.

INTRODUCTION

The subject disclosure relates to vehicle route determinations, and more specifically to vehicle route determinations in consideration of propulsion systems available to the vehicle.

In general, navigation systems allow a user or operator of a vehicle to enter a starting point and a destination point. The navigation system may access a map database containing road information. The navigation system may use the starting point, destination point and the map database to compute one or more routes from the starting point to the destination point. The navigation system may then present one or more of the computed routes to a user. The presented routes are usually based on a fastest route or shortest route.

Multimodal vehicles are vehicles that use more than one type of propulsion and/or propulsion energy source for propelling the vehicle. Multimodal vehicles include algorithms that control vehicle propulsion systems during every day driving. However, routes provided by navigation systems associated with each of the multimodal vehicles often fail to consider or determine the best manner to utilize the available types of propulsion while traversing a determined route. In addition, even if present propulsion control systems could anticipate the terrain and other factors, the multimodal vehicle may inefficiently allocate usage between the modes of the vehicles.

Accordingly, it is desirable to provide a system that can evaluate candidate routes based on characterizing predicted energy consumption, so that an optimal route can be selected from the candidate routes considering minimum energy consumption.

SUMMARY

In an exemplary embodiment, a method for determining a route using route segment characterizations is disclosed. The method includes receiving, by a processor, a destination. The method further includes determining, by the processor, one or more routes to the destination from a first location. The method further includes dividing, by the processor, each of the one or more routes into one or more route segments. The method further includes characterizing, by the processor, each of the one or more route segments according to propulsion resources available to a vehicle. The method further includes providing, by the processor, an optimized route from the one or more routes based on the characterization of the one or more route segments.

In accordance with one or more embodiments or the method embodiments above, the method can further include displaying the optimized route on a display of the vehicle.

In accordance with one or more embodiments or any of the method embodiments above, the characterization of each of the one or more route segments can be based on a fuel energy versus a battery energy curve.

In accordance with one or more embodiments or any of the method embodiments above, the optimized route can be provided based on near-term energy characteristics and long-term energy characteristics.

In accordance with one or more embodiments or any of the method embodiments above, a routing engine can utilize segment topography associated with each of the one or more route segments.

In accordance with one or more embodiments or any of the method embodiments above, a propulsion control system can utilize associated with the optimized route to control an operation of the propulsion resources available to the vehicle while traversing the optimized route.

In accordance with one or more embodiments or any of the method embodiments above, the propulsion resources available to a vehicle can include at least one of two of: a fuel, an electric and a hydrogen resource.

In another exemplary embodiment, a system for determining a route using route segment characterizations is disclosed. The system includes one or more vehicles and one or more servers. Each server includes a memory and a processor coupled to the memory. The processor is operable to receive a destination. The processor further determines one or more routes to the destination from a first location. The processor further includes divides each of the one or more routes into one or more route segments. The processor characterizes each of the one or more route segments according to propulsion resources available to a vehicle. The processor provides an optimized route from the one or more routes based on the characterization of the one or more route segments.

In accordance with one or more embodiments or the system embodiments above, the processor can be further operable to display the optimized route on a display of the vehicle.

In accordance with one or more embodiments or any of the system embodiments above, the characterization of each of the one or more route segments can be based on a fuel energy versus a battery energy curve.

In accordance with one or more embodiments or any of the system embodiments above, the optimized route can be provided based on near-term energy characteristics and long-term energy characteristics.

In accordance with one or more embodiments or any of the system embodiments above, a routing engine can utilize segment topography associated with each of the one or more route segments.

In accordance with one or more embodiments or any of the system embodiments above, a propulsion control system can utilize associated with the optimized route to control an operation of the propulsion resources available to the vehicle while traversing the optimized route.

In accordance with one or more embodiments or any of the system embodiments above, the propulsion resources available to a vehicle can include at least one of two of: a fuel, an electric and a hydrogen resource.

In another exemplary embodiment, a non-transitory computer readable storage medium having program instructions is provided. The program instructions are readable by a processor to cause the processor to receive a destination. The processor further determines one or more routes to the destination from a first location. The processor further includes divides each of the one or more routes into one or more route segments. The processor characterizes each of the one or more route segments according to propulsion resources available to a vehicle. The processor provides an optimized route from the one or more routes based on the characterization of the one or more route segments.

In accordance with one or more embodiments or the computer readable storage medium embodiment above, the program instructions can be readable by the processor to cause displaying the optimized route on a display of the vehicle.

In accordance with one or more embodiments or any of the computer readable storage medium embodiments above, the characterization of each of the one or more route segments can be based on a fuel energy versus a battery energy curve.

In accordance with one or more embodiments or any of the computer readable storage medium embodiments above, the optimized route can be provided based on near-term energy characteristics and long-term energy characteristics.

In accordance with one or more embodiments or any of the computer readable storage medium embodiments above, a routing engine can utilize segment topography associated with each of the one or more route segments.

In accordance with one or more embodiments or any of the computer readable storage medium embodiments above, a propulsion control system can utilize associated with the optimized route to control an operation of the propulsion resources available to the vehicle while traversing the optimized route.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
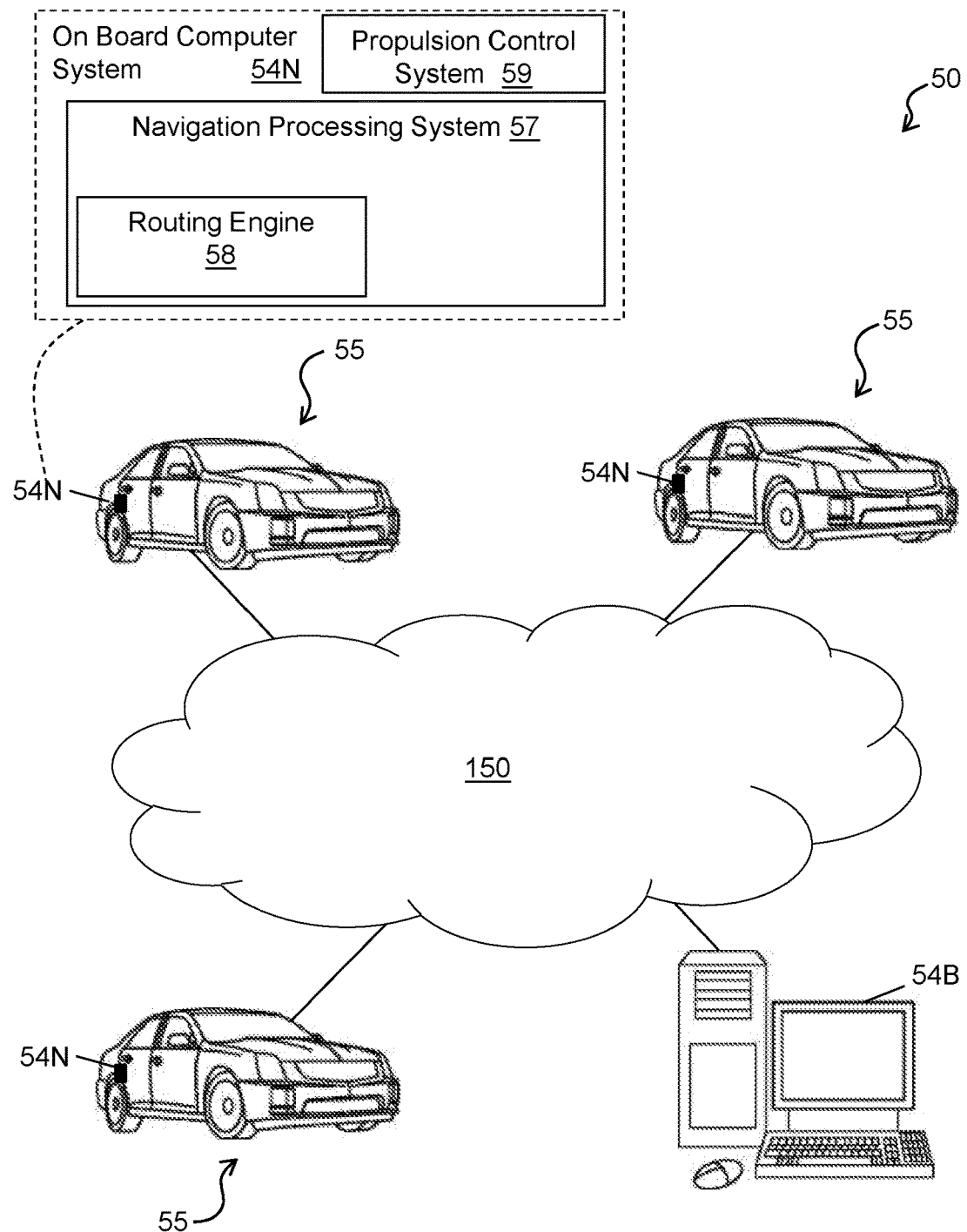
FIG. 1 is a computing environment according to one or more embodiments.

The present disclosure is merely exemplary in nature and is not intended to be limiting, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Embodiments herein relate to, a system for determining a route using route segment characterizations is disclosed. The system can evaluate candidate routes based on characterizing predicted energy consumption on each route segment of the candidate routes, so that a route with optimal energy consumption can be selected from the candidate routes. In this regard, the system receives a destination and determines one or more routes to the destination from a first location (e.g., a current location or a starting location). Then, each of the one or more routes are divided into one or more route segments, which are characterized according to propulsion resources available to a vehicle. An optimized route from the one or more routes based on the characterization of the one or more route segments is provided. Thus, a technical effect and benefit of the system includes providing insight into the future by having, processing, and acting on a upcoming route without a priori knowledge of a future route.

In accordance with one or more embodiments, FIG. 1 illustrates a computing environment 50. As shown, computing environment 50 comprises one or more computing devices, for example, a server/Cloud 54B and/or an automobile onboard computer system 54N incorporated into each of a plurality of autonomous or non-autonomous vehicles 55, which are connected via network 56. The automobile onboard computer system 54N can include a navigation processing system 57, which can further include a routing engine 58, and a propulsion control system 59, which drives a propulsion system.

The one or more computing devices can communicate with one another using network 56. The server/Cloud 54B is illustrative of cloud-based systems that provide processing resources to the processing system of the vehicle 55, which are illustrated by the automobile onboard computer system 54N. Processing resources can include, but are not limited to, central processing units (CPUs), graphic processing units (GPUs), field-programmable gate arrays (FPGAs), etc.

The network 56 can be, for example, a cellular network, a local area network (LAN), a wide area network (WAN), such as the Internet and Wi-Fi, a dedicated short range communications network (for example, V2V communication (vehicle-to-vehicle), V2X communication (i.e., vehicle-to-everything), V2I communication (vehicle-to-infrastructure), and V2P communication (vehicle-to-pedestrian)), or any combination thereof, and may include wired, wireless, fiber optic, or any other connection. The network 56 can be any combination of connections and protocols that will support communication between server/Cloud 54B, and/or the plurality of vehicle on-board computer systems 54N, respectively. The coordination between the server/cloud 54B and the vehicle on-board computer system 54N can occur using, cellular or WIFI, communications to transfer image data, key frames, position data and trip data between the vehicle 55 and the remote resource. The coordination between the server/cloud 54B and the vehicle on-board computer system 54N enables the vehicle on-board computer system 54N to perform SLAM operations that have latency deadlines, while allowing the server/cloud 54B to perform the operations that do not have latency deadlines.

The vehicle on-board computer systems 54N for each of the plurality of vehicles 55 can include a global positioning system (GPS) transmitter/receiver (not shown) which is operable for receiving location signals from a plurality of GPS satellites (not shown) that provide signals representative of a location for each of the mobile resources, respectively. In addition to the GPS transmitter/receiver, each vehicle 55 associated with one of the plurality of vehicle on-board computer systems 54N may include the navigation processing system 57 that can be arranged to communicate with a server/Cloud 54B through the network 56. Accordingly, each vehicle 55 associated with one of the plurality of vehicle on-board computer systems 54N is able to determine location information and transmit that location information to the server/Cloud 54B or another vehicle on-board computer system 54N.

A vehicle on-board computer system 54N may also include one or more active and passive sensors (e.g., radar, light detection and ranging (LIDAR), internal and external cameras, weather, longitudinal acceleration, voice recognition, or the like). The vehicle on-board computer system 54N may also include one or more microphones and a speech processing application.

Additional signals sent and received may include data (e.g., image data obtained from cameras associated with the vehicle on-board computer system 54N), communication, and/or other propagated signals (e.g., signals associated with LIDAR and/or radar). Further, it should be noted that the operations of transmitter and receiver can be combined into a signal transceiver.

The vehicle on-board computer system 54N and server/Cloud 54B may both include memory components that store high-definition feature set data and can also include processing components that process the high-definition map data. For example, each vehicle 55 can store high-definition feature set data within a non-volatile memory. The vehicle on-board computer system 54N and server/Cloud 54B may both store the same or similar information related to the feature set data and routing information.

The server/Cloud 54B can serve as a remote compute resource (e.g., a server and/or a cloud system, including an edge cloud). The server/Cloud 54B can be implemented as a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Figure 2:
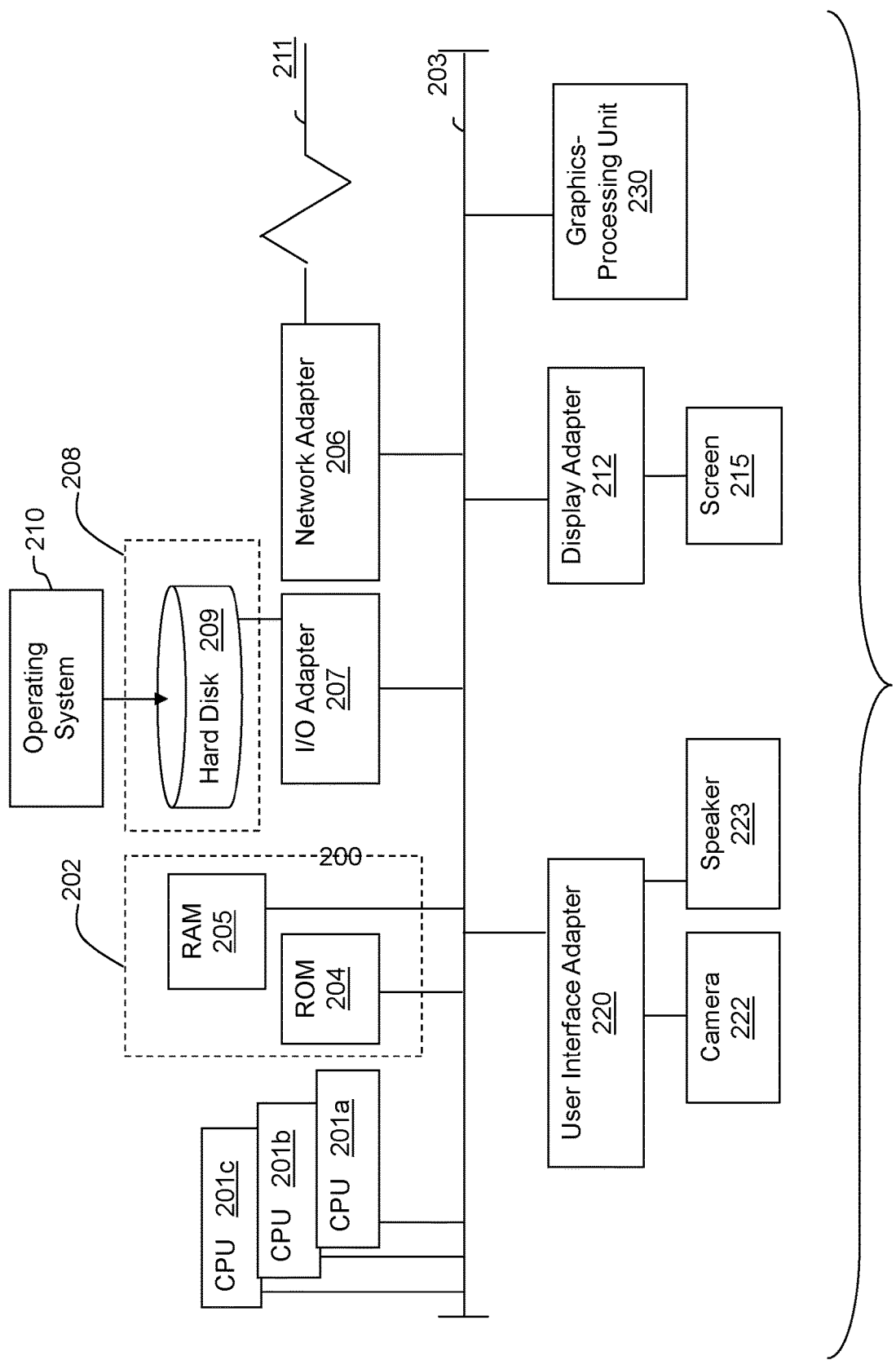
FIG. 2 is a block diagram illustrating one example of a processing system for practice of the teachings herein.

In accordance with an exemplary embodiment, FIG. 2 illustrates a processing system 200 for implementing the teachings herein. The processing system 200 can form at least a portion of the one or more computing devices, such as server/Cloud 54B and/or vehicle on-board computer system 54N. The processing system 200 may include one or more CPUs (processors) 201a, 201b, 201c, etc. (collectively or generically referred to as a processor 201). The processor 201 is coupled to system memory 202 and various other components via a system bus 203. The system memory 202 can include a read only memory (ROM) 204, can include a random access memory (RAM) 205, and can include a basic input/output system (BIOS), which controls certain basic operations of the processing system 200.

FIG. 2 further depicts a network adapter 206 and an input/output (I/O) adapter 207 coupled to the system bus 203. The I/O adapter 207 may be a small computer system interface (SCSI) adapter that communicates with a mass storage 208, which can include a hard disk 209 and/or other storage drive or any other similar component. An operating system 210 for execution on the processing system 200 may be stored in the mass storage 208. The operating system 210 can form at least a portion of the software for determining, while computing routes, utilization of available propulsion resources in an optimized manner along segments of the routes. Note that this determination could also take place in the processor 201 (e.g., if the processing system 200 determines a best drive route can be different, then the processing system 200 characterizes and determines an optimal energy route for that best drive route). The network adapter 206 interconnects the system bus 203 with an outside network 211 enabling the processing system 200 to communicate with other such systems.

A display adaptor 212 can connect a screen 215 (e.g., a display monitor) to the system bus 203 and may include a graphics adapter to improve the performance of graphics intensive applications and a video controller. In one embodiment, adapters 207, 206, and 212 may be connected to one or more I/O busses that are connected to the system bus 203 via an intermediate bus bridge. Suitable I/O buses for connecting peripheral devices such as hard disk controllers, network adapters, and graphics adapters typically include common protocols, such as the Peripheral Component Interconnect (PCI). Additional input/output devices are shown as connected to the system bus 203 via a user interface adapter 220. A camera 222 and a speaker 223 can all be interconnected to the system bus 203 via the user interface adapter 220, which may include, for example, a Super I/O chip integrating multiple device adapters into a single integrated circuit.

The processing system 200 may additionally include a graphics-processing unit 230. Graphics processing unit 230 is a specialized electronic circuit designed to manipulate and alter memory to accelerate the creation of images in a frame buffer intended for output to a display and/or for ascertaining and analyzing of a feature set. In general, graphics-processing unit 230 is very efficient at manipulating computer graphics and image processing, and has a highly parallel structure that makes it more effective than general-purpose CPUs for algorithms where processing of large blocks of data is done in parallel.

Thus, as configured in FIG. 2, the processing system 200 includes processing capability in the form of processors 201, storage capability including the system memory 202 and the mass storage 208, input means such as the camera 222, and output capability including the speaker 223 and the display 215. In one embodiment, a portion of the system memory 202 and the mass storage 208 collectively store the operating system 210 to coordinate the operations of the various components.

Figure 3:
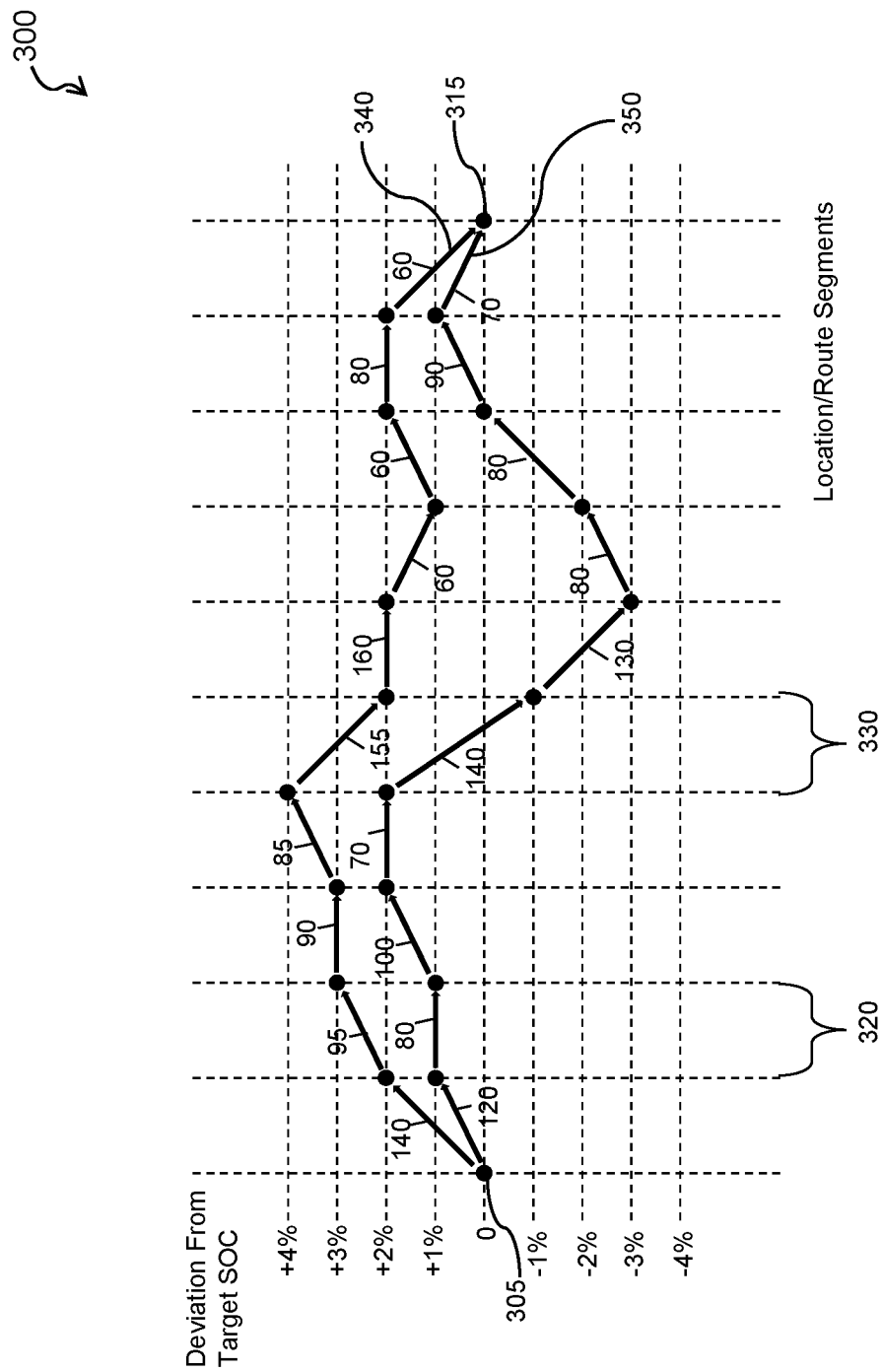
FIG. 3 depicts a route segment characterization based on available types of propulsion for a vehicle traversing a calculated route according to one or more embodiments.

FIG. 3 depicts a route segment characterization 300 (e.g., by the computing environment 50 of FIG. 1 and/or the processing system 200 of FIG. 2) based on available types of propulsion for a vehicle traversing a calculated route according to one or more embodiments. The navigation processing system 57 associated with each of the plurality of vehicle on-board computer systems 54N can determine a navigable route from a requested start location (e.g., and continue throughout the drive from a current location) to a destination. The navigation processing system 57 can include the routing engine 58, which may include computer-readable instructions that, in response to execution by the processor(s) 201, cause operations to be performed including creating a navigable route from a requested starting location or current location 305 to a destination 315.

The routing engine 58 can utilize stored map data associated with vehicle on-board computer systems 54N and/or received map data (e.g., from the server/Cloud 54B) for a plurality of route/road segments. Note that the navigable route can be first determined, and then that navigable route is quantized into smaller road segments. Further, if the road segments are known, the routing engine 58 can re-query as well. Map data associated with each segment can include: a number of lanes, road and infrastructure information (e.g., road/lane closures, traffic, accidents, locations of stop signs, traffic intersections, onramps, off ramps/exits, etc.), elevation information, gradient information (incline/decline), weather data, curvature associated with any portion of the route segment (i.e., segment topography), fuel expenditure according to speed traversing the segment and/or segment topography, battery energy expenditure/gain (utilization) according to speed traversing the segment and/or segment topography (e.g., which could be a by-product of embodiments herein), and/or any combination thereof.

The routing engine 58 can also utilize driver specific data. For example, the driver specific data can be related to previous traversals of route segments which the routing engine 58 can use as part of the navigable route, including data related to how a driver traversed the route segment (e.g., fast, slow, normal, aggressive, leisurely, etc.).

The routing engine 58 can also utilize vehicle information about the vehicle traversing the navigable route. For example, the routing engine 58 can receive vehicle data (e.g., make, model, height, weight, tire size, propulsion resources (e.g., fuel, electric, hydrogen, hybrid, etc.), or the like) from the vehicle on-board computer systems 54N and/or server/Cloud 54B. Note that a hybrid propulsion systems can include gas and battery systems, diesel and battery system, hydrogen/fuel cell and battery systems.

Accordingly, instead of merely attempting to maintain a current state of charge (SoC) along a navigable route, the present routing engine 58 can utilize map data, driver specific data and vehicle information associated with each route segment to determine an optimized navigable route that optimizes when an available propulsion resource will be used on a route segment by route segment basis in order to minimize fuel consumption while charging or discharging the battery to maintain a desired SoC. The propulsion control system 59 (e.g., implemented in one of the processors) can use the navigable route provided by the routing engine 58 to make real time decisions on fuel versus battery power consumption for a vehicle traversing the navigable route by recognizing a distinction between near-term fuel/battery energy characteristics versus long-term characteristics.

For example, when determining an energy path from 305 to 315, the routing engine 58 can calculate an energy path 340 and an energy path 350. Note that each segment of the energy paths 340 and 350 represents a fuel consumption and includes a value indicating an estimated amount of fuel consumption for that segment. The (non-optimal) energy path 340 attempts to simply maintain a SoC of 0% (i.e., zero net charge or discharge) without consideration of segment topography, vehicle information or driver specific data. Accordingly, energy path 340 merely considers SoC opportunities while traversing a route segment. As such, a propulsion control system 59 of a vehicle traversing route segment 320 of the energy path 340 attempts to charge a battery for the vehicle even though the route segment is not conducive to charging the battery, or an optimal charging of the battery. Accordingly, by attempting to charge the battery while traversing along route segment 320, fuel must be used to propel the vehicle along the navigable route, which increases fuel consumption and decreases fuel economy for the vehicle.

The (optimal) energy path 350 takes into consideration segment topography, vehicle information and/or driver specific data in an attempt to maintain a desired SoC, here, 0% while optimizing fuel consumption by considering battery charge and discharge opportunities for a given route segment in light of the entire navigable route. The propulsion control system 59 of the vehicle traversing route segment 320 of the energy path 350 can recognize that route segment 320 is not conducive to battery charging (e.g., route segment 320 is level or slightly inclined in the direction of traversal) and can also recognize that other route segments of the navigable route provide better opportunities to charge the battery because the propulsion control system 59 takes into account charging opportunities along the entire navigable route. Accordingly, the propulsion control system 59, recognizing that route segment 320 is level or slightly inclined, does not attempt to charge the battery for the vehicle because the route segment 320 is not conducive to charging the battery in an optimal manner and other route segments exist along the navigable route that are better suited to charge the battery. Accordingly, propulsion control system 59 can maintain or decrease fuel consumption for the vehicle thereby increasing fuel economy.

Regarding a traversal of a route segment 330 in the energy path 340, the propulsion control system 59 can utilize the battery to traverse the route segment 330 or assist in the traversal of the route segment 330, while the SoC remains above 0% because the battery is at a state of +4% above the SoC target. The propulsion control system 59 of the vehicle traversing the energy path 350 can also utilize the battery to traverse the route segment 330 or assist in the traversal of the route segment 330. However, the propulsion control system 59 of the vehicle traversing the energy path 350 can recognize that more battery power can be expended traversing route segment 330 as compared to that of the energy path 340 because the automobile onboard computer system 54N can consider segment topography, vehicle information and/or driver specific data (i.e., route traversal factors) for the entire energy path 350 to better determine which propulsion resource or combination thereof should be used to traverse route segment 330, as well as when and how the propulsion resource or combination thereof should be used to traverse route segment 330. Because the routing engine 58 has forecasted a potential energy expenditure for each route segment of the energy path 350 upon a determination of the energy path 350, the routing engine 58 can instruct the propulsion control system 59 to utilize additional battery power to traverse route segment 330, potentially causing the SoC to fall below (e.g., below 0%) the desired SoC due to a recognition that opportunities exist in one or more of the remaining route segments of navigable route 350 to charge the battery to the desired SoC. Accordingly, while the SoC of the battery for the vehicle traversing route segment 330 falls below the desired SoC, a fuel expenditure to traverse the route segment 330 is optimized due to the consideration of charging opportunities remaining along the navigable route (i.e., long-term charging opportunities).

Figure 4:
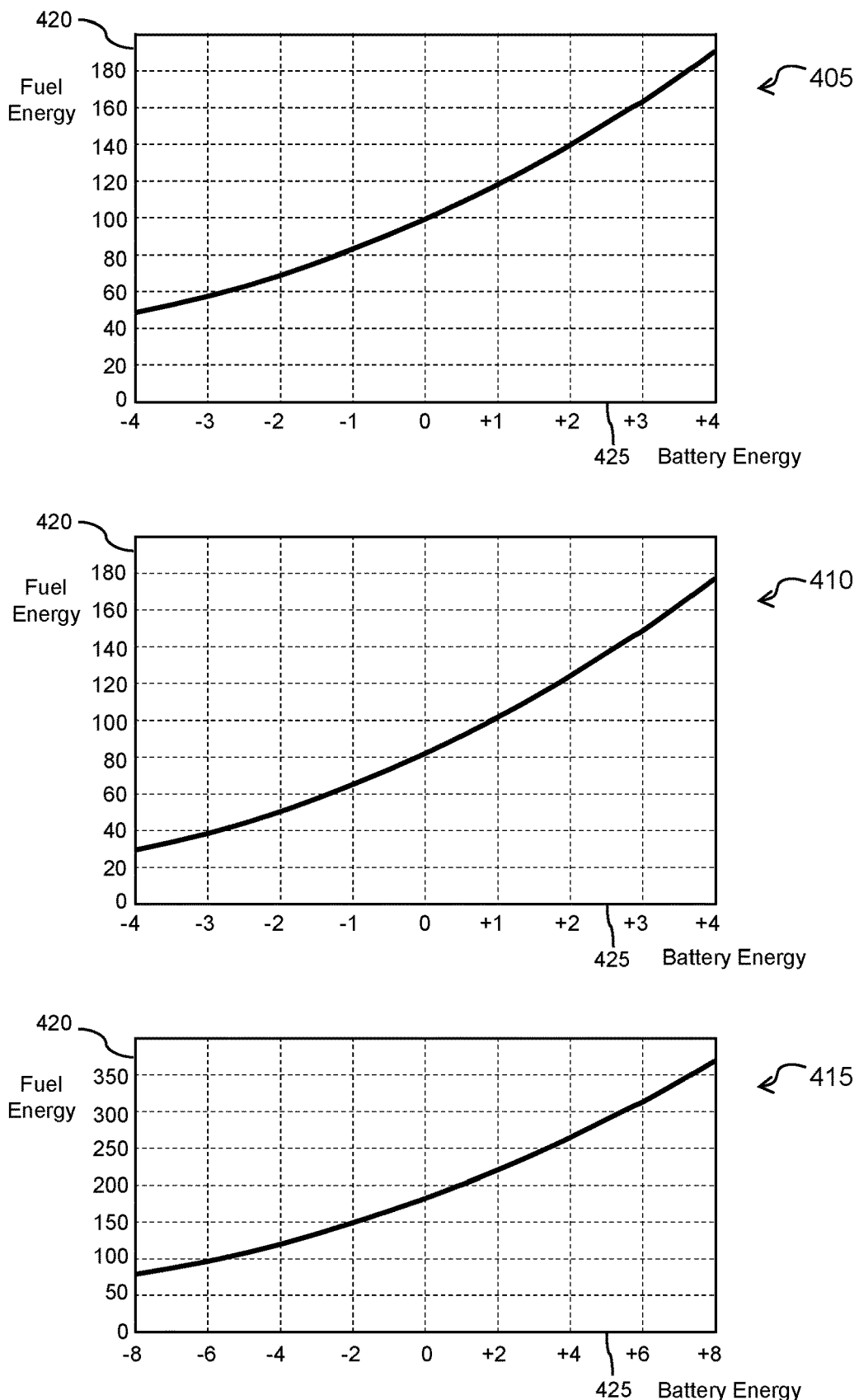
FIG. 4 depicts a route segment characterization according to one or more embodiments.

In accordance with an exemplary embodiment, FIG. 4 depicts route segment characterization plots 405, 410, and 415 according to one or more embodiments. The route segment characterization plots 405, 410, and 415 for each route segment in a navigable route can used to determine near-term energy characteristics (i.e., current propulsion resources available and levels thereof, as well as when and how the available propulsion resources should be used), which can relate to a currently traversed route segment of a navigable route and long-term energy characteristics which can relate to a route segments of the navigable route to be traversed in the future.

The route segment characterization can represent fuel energy 420 versus battery energy 425 curves 405, 410, and 415. An amount of the fuel energy 420 can be represented in fuel mass, fuel volume, fuel energy, and/or a ratio of amount to some fuel total (e.g., a total tank amount). The amount of the battery energy 425 can be represented in a change in the state of energy of the battery and/or a change in the SoC of the battery. At least a portion of the fuel energy 420 versus battery energy 425 curves 405, 410, and 415 can be related to a respective segment topography. Curve 405 can represent a fuel energy 420 versus battery energy 425 curve for a first route segment associated with a navigable route. The curve 405 can range from full battery use and no fuel expended to no battery usage and fuel only being used to propel the vehicle. Curve 410 can represent a fuel energy 420 versus battery energy 425 curve for a second route segment associated with the navigable route. Curve 415 can represent a fuel energy 420 versus battery energy 425 curve representing a combination of curves for the first route segment and second route segment.

Additional route segments of the navigable route can be combined by routing engine 58 for use by the propulsion control system 59 of a vehicle (e.g., the one or more processors 201). Each route segment can be assigned a weight based on an associated curved, which can be used by the routing engine 58 to determine an optimized propulsion resource usage for each route segment of the navigable route. The optimization can be in consideration of long-term fuel/battery expenditures and battery charging over an entire navigable route. Other propulsion resources can be used to characterize a route segment.

Figure 5:
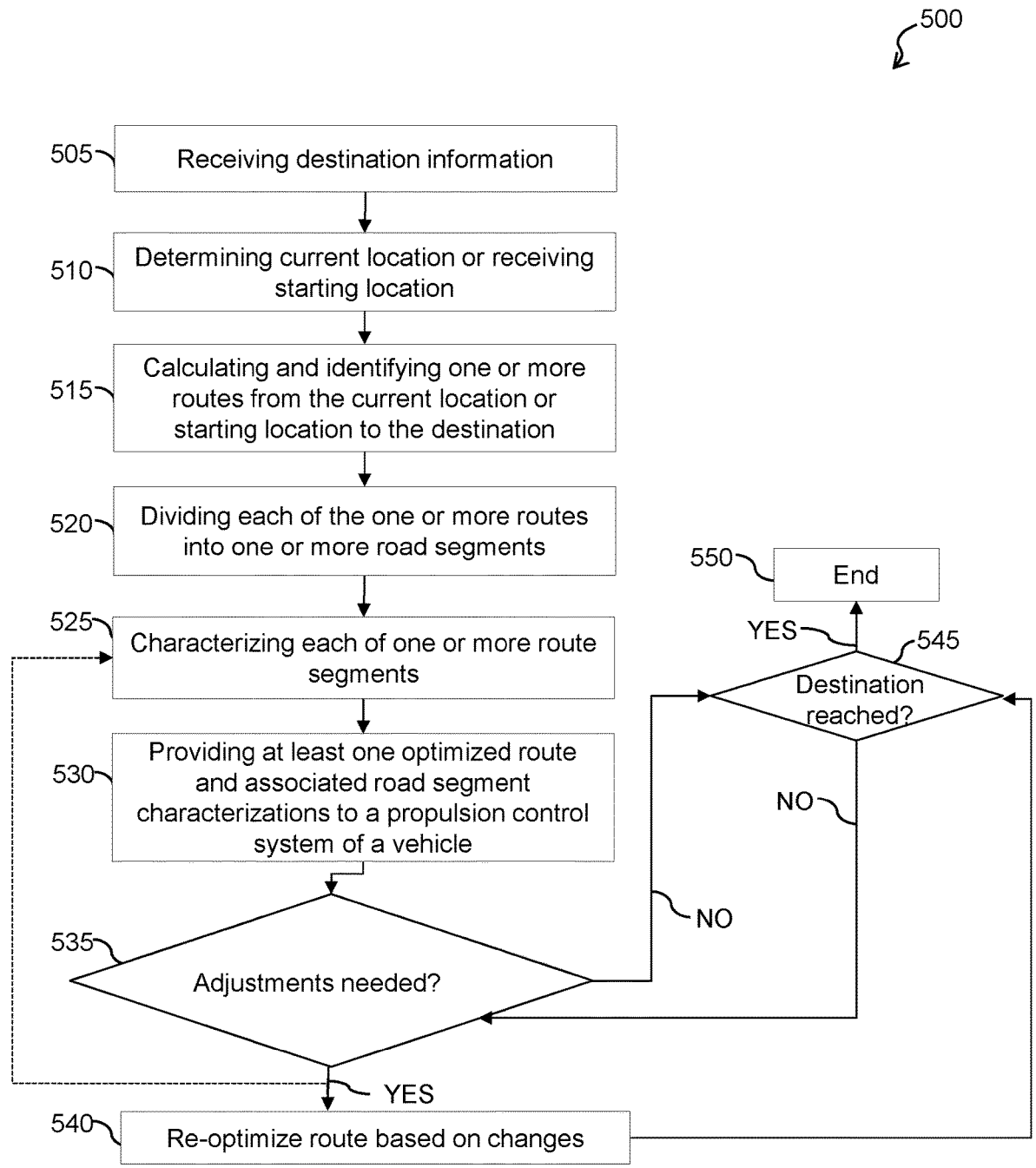
FIG. 5 depicts a flow diagram of a method for routing a vehicle based on one or more route segment characterizations according to one or more embodiments.

FIG. 5 depicts a flow diagram of a method 500 for routing a vehicle based on one or more route segment characterizations according to one or more embodiments. At block 505, automobile onboard computer systems 54N or a server, for example server/Cloud 54B, can receive a destination for use in calculating/determining a navigable route for a vehicle. At block 510, the automobile onboard computer systems 54N or server/Cloud 54B can determine a current location of the vehicle or receive a starting location for use in calculating/determining the navigable route for the vehicle.

At block 515, the automobile onboard computer systems 54N or server/Cloud 54B can calculate and identify one or more navigable routes in response to the received destination and current location or received starting location. At block 520, the automobile onboard computer systems 54N or server/Cloud 54B can divide each of the one or more navigable routes into one or more route segments. In addition, portions of a road network can be pre-divided into route segments and stored in a memory, for example, system memory 214.

At block 525, the automobile onboard computer systems 54N or server/Cloud 54B can characterize each of the one or more route segments (e.g., as shown in the curves 405 and 410). In addition, the characterizations of route segments can be associated with a respective route segment and stored in a memory, for example, system memory 214. The characterization can be based on an associated fuel energy versus a battery energy curve assigned to each route segment. Note that the characterization of each of the candidate routes (as a whole) is based on fuel energy vs. battery energy. At block 530, the automobile onboard computer systems 54N or server/Cloud 54B can use the characterizations assigned to each route segment to select/determine an optimized navigable route from the determined one or more navigable routes, which can be provided to a driver (visually via display and/or audible via speakers).

At decision block 535, the automobile onboard computer systems 54N or server/Cloud 54B can determine whether an adjustment to one or more route segment characterizations is needed due to changes in the map data and/or driver specific data. For example, a driving style for a driver of a vehicle can change from normal to aggressive. Accordingly, a change in driving style can affect battery expenditures, as well as fuel consumption. If the automobile onboard computer systems 54N or server/Cloud 54B determines that an adjustment to one or more route segment characterizations is not needed, the method 500 proceeds to decision block 545 (as shown by the NO arrow) where the automobile onboard computer systems 54N or server/Cloud 54B can determine whether the vehicle has reached the received destination. If the vehicle has reached the received destination, the method 500 ends at 550 (as shown by the YES arrow). If the vehicle has not reached the destination, the method 500 returns to decision block 535 (as shown by the NO arrow).

If the automobile onboard computer systems 54N or server/Cloud 54B determines that an adjustment to one or more route segment characterizations is needed, the method 500 proceeds to block 540 (as shown by the YES arrow) where the automobile onboard computer systems 54N or server/Cloud 54B can perform a re-optimization of the optimized route. Then, at decision block 545, the automobile onboard computer systems 54N or server/Cloud 54B can determine whether the vehicle has reached the received destination. If the vehicle has reached the received destination, the method 500 ends at 550 (as shown by the YES arrow). If the vehicle has not reached the destination, the method 500 returns to block 535 (as shown by the NO arrow).

Optionally, if the automobile onboard computer systems 54N or server/Cloud 54B determines that an adjustment to one or more route segment characterizations is needed, the method 500 can alternatively return to block 525 (as shown by the dashed-arrow) to determine whether a better route exists instead of the optimized route provided in light of the adjustment to one or more route segment characterizations.

Figure 6:
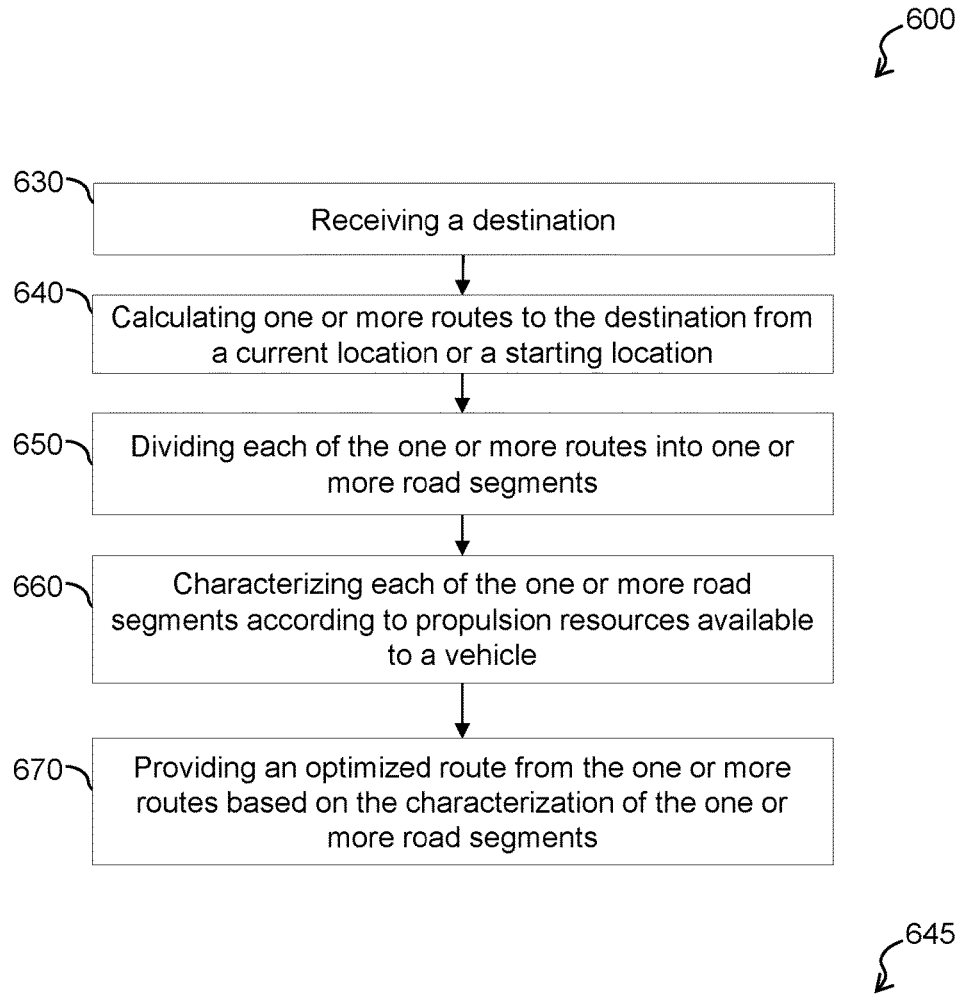
FIG. 6 depicts a process flow according to one or more embodiments.

In view of the disclosure herein, FIG. 6 depicts a process flow 600 according to one or more embodiments. The process flow 600 can be implemented by the automobile onboard computer systems 54N and/or the server/Cloud 54B. In general, the process flow 600 relates to determining a route using route segment characterizations. The process flow 600, when executed, evaluates candidate routes based on characterizing predicted energy consumption on each route segment of the candidate routes, so that a route with optimal energy consumption can be selected from the candidate routes.

The process flow 600 beings at block 630, where the automobile onboard computer systems 54N and/or the server/Cloud 54B receives a destination. At block 640, the automobile onboard computer systems 54N and/or the server/Cloud 54B determine one or more routes to the destination from a first location.

The destination (e.g., final destination) and the first location (e.g., a current location or a starting location) of the vehicle 55 are both used as inputs to determine the one or more routes. Note that the process flow 600 is agnostic to how the one or more routes are determined (e.g., utilizing third party mapping software), as the details of the one or more routes provide the necessary inputs to the process flow 600. For example, as shown in table 645, the one or more routes can include three candidate routes A, B, and C.

At block 650, the automobile onboard computer systems 54N and/or the server/Cloud 54B divides each of the one or more routes into one more route segments. That is, once the one or more routes from the first location to the final destination are identified, these routes can be quantized into separate route segments. The number of route segments can be defined by an integer number N (e.g., any positive integer value equal to or greater than one). Quantization can occur by separating the route into equidistant segments, into segments based on road types (e.g., highway vs. local roads), into segments based on topography/terrain (e.g., hills vs. flat roads), and/or combination thereof. Quantization can occur with a loop through candidate routes. At block 660, the automobile onboard computer systems 54N and/or the server/Cloud 54B characterizes each of the one or more route segments according to propulsion resources available to a vehicle. Characterizing the route segments can be performed according to the process flow 800 of FIG. 8 and the process flow 900 of FIGS. 9A-9B, as described herein. Note that energy characterization produces an estimated energy for each route segment. In accordance with one or more embodiments, individual route segments (e.g., if so quantized) of a candidate route can be combined into a single characterization, such that the result is an energy characterization for each candidate route. Then, the candidate route that minimizes energy can be selected (e.g., including given an objective, like neutral battery SOC, for a hybrid where the fuel at zero battery delta SoC would be compared for the candidate routes). Note that if each candidate route is quantized into two or more route segments, then the characterization of the segments would be combined into a single characterization. In the end, one energy characterization (e.g., curve 415 for a hybrid, a single energy value for a single energy source like an electric vehicle) will exist for each candidate route. Then, these energy characterizations can be compared and the optimal route selected.

Continuing with the table 645 example, each of the three candidate routes A, B, and C can be associated with an estimated time and distance. Note that the process flow 600 is agnostic to how the estimated time and distance are determined (e.g., utilizing third party mapping software). Further, based on the quantization and the characterization, each of the one or more routes receives at least one estimated energy. That is, an estimated energy can be calculated for a conventional, a hybrid, and/or electric vehicle traveling each of the three candidate routes A, B, and C. In accordance with one or more embodiments, the calculation of the estimated energy may be custom executed for the present type of vehicle (e.g., each individual vehicle could yield a different optimal route).

At block 670, the automobile onboard computer systems 54N and/or the server/Cloud 54B provides an optimized route from the one or more routes based on the characterization of the one or more route segments. The optimized route can be relabeled as a chosen path from Point A (e.g., the first location) to Point B (e.g., the final destination). In accordance with one or more embodiments, the propulsion control system 59 can utilize the estimated energy with respect to the optimized route to minimize a total fuel consumption while maintaining the desired final SoC if a hybrid. As shown in table 645, the candidate route C is an optimized route for a conventional vehicle, the candidate route B is an optimized route for a hybrid vehicle, and the candidate route A is an optimized route for an electric vehicle. In this way, each vehicle could yield a different answer, which is not the same case with time, distance, toll road avoidance, scenic, etc.

Figure 7:
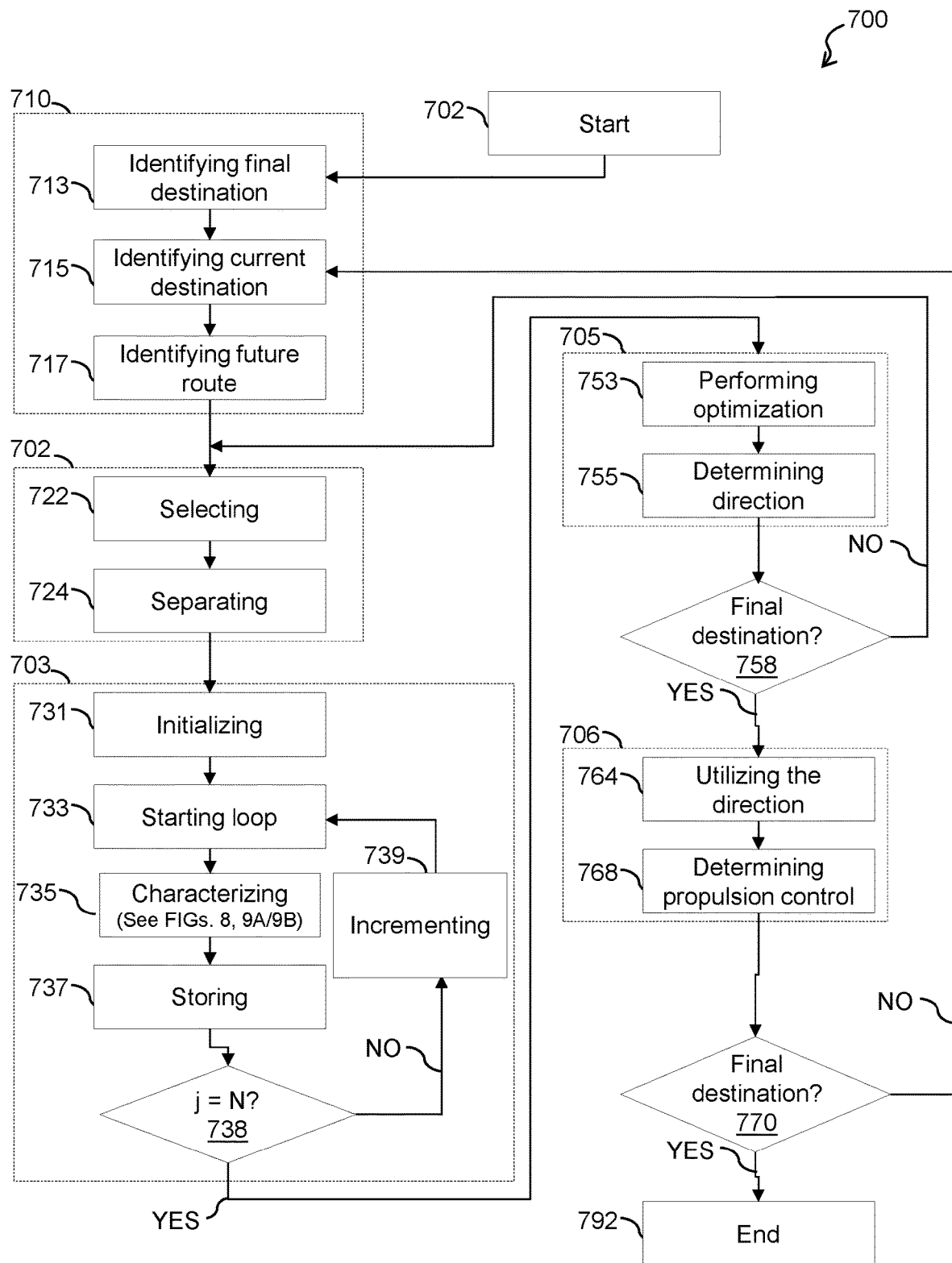
FIG. 7 depicts a process flow according to one or more embodiments.

FIG. 7 depicts a process flow 700 according to one or more embodiments. In general, the process flow 700 is a method to optimize and select and then communicate or execute the optimal route for minimum energy consumption considering driver, traffic, vehicle and propulsion system characteristics. The process flow 700, from a high level control perspective loops, through a number of operations (e.g., five). As shown, the process flow 700 includes a location identification and candidate route determination at dashed-block 701, a candidate route quantization at dashed-block 702, a candidate route segment characterization at dashed-block 703, a candidate route characterization at dashed-block 705, and an optimized route selection at dashed-block 706. Each of the five operations will be discussed in detail in sections herein.

A shown in FIG. 7, the location identification and candidate route determination at dashed-block 701 can be divided into blocks 713, 715, and 717. At block 713, the routing engine 58 identifies a final destination. Examples of identifying a final destination include, but are not limited to, receiving a user input via an onboard vehicle navigation system or mobile mapping applications. In turn, the different final destination is used as a new final destination. At block 715, the routing engine 58 identifies a first location or a current location. Examples of identifying a first location include, but are not limited to, utilizing satellite communications with the onboard navigation system and a combination of a GPS and mobile mapping applications.

At block 717, the routing engine 58 identifies future candidate routes from the first location. The future candidate routes include entire routes with all future map directions and particular route segments that could be driven. And while there may be a number of different candidate routes, the process flow 700 is agnostic to how the particular future routes are selected. Rather, the process flow 700 seeks to have the most correct information (e.g., road types, topography/terrain, traffic, events) about the possible future routes. As noted herein, the final destination and the first location of the vehicle are both used as inputs to identify the future candidate routes. Further, the identification of the future candidate routes may be required once for a drive cycle, unless a different final destination at some point during the drive cycle is selected or the vehicle deviates from the previously identified route. Furthermore, the identification of the future candidate routes can be continually reassessed, as traffic conditions (amongst other things) may change during the drive that might change the "optimal" path.

The candidate route quantization at dashed-block 702 can be divided into blocks 722 and 724. At block 722, the automobile onboard computer system 54N (e.g., the routing engine 58) quantizes the future candidate routes by choosing a number of separate route segments. That is, once the future candidate routes from the first location to the final destination are identified, the future candidate routes can be quantized into separate route segments as described herein. Note that, for propulsion control purposes, a number of separate route segments N should be one or greater because the differences in the characterization of the segments is an important piece of information. Further, the segments can get infinitesimally small as the distance of the entire route approaches zero (e.g., as the vehicle approaches the final destination). For example, a future route from the first location to the final destination can be quantized into three separate route segments (e.g., N=3). Note that quantization has a particular value if different candidate routes share common segments, so that the analysis can particularly focus on the differences between the routes.

At block 724, the automobile onboard computer system 54N quantizes the future candidate routes by dividing the future candidate routes into the chosen number of separate route segments. Continuing with the three segment example (e.g., N=3), for a first candidate route, a first segment can be from the first location to a first intersection with a first traffic light, a second segment can extend from this first intersection to a second intersection at a highway, and a third segment can cover a remaining portion of the first candidate route along the highway to the final destination. In some cases, the first segment can generally represent a near-term segment from the first location to some near-term future location, while the third segment generally represents the long term segment. Further, for an efficient processing approach, the automobile onboard computer system 54N may maintain the second and third segments across multiple loops so those segments are not re-characterized. Then, at some later time, the second and third segments can moved and re-characterized when the vehicle 55 is closer to the final destination.

The candidate route segment characterization (e.g., characterizing the one or more route segments according to propulsion resources available to the vehicle 55) at dashed-block 703 can be divided into blocks 731, 733, 735, 737, 738, and 739, which illustrate performing a control loop on each of the N segments of each future candidate route. More particular, the candidate route segment characterization at dashed-block 703 can be performed on each future candidate route sequentially, until all candidate routes are characterized.

At block 731, the routing engine 58 initializes a loop counter (e.g., j=1). At block 733, the routing engine 58 calls a function ("Characterize Route Segment j") to characterize a particular route segment of a particular future candidate route. At block 735, the routing engine 58 characterizes the route segment to determine an estimated energy for that segment. The characterizing of the route segment can be implemented in two-parts, such as a first part shown according to the process flow 800 of FIG. 8 and a second part shown according to the process flow 900 of FIGS. 9A-9B, as described herein. At block 737, the routing engine 58 stores the route characterization (e.g., an energy characterization or estimated energy for each route segment). At decision block 738, the routing engine 58 determines if a last segment has been reached by comparing the loop counter to the selected number of segments (e.g., does j=N). If the last segment has not been reached, the process flow 700 proceeds to block 739 (as indicated by the NO arrow), where the loop counter is incremented (e.g., j=j+1). Then, the process flow 700 loops back to block 733. If the last segment has been reached, the process flow 700 proceeds to dashed-block 705 (as indicated by the YES arrow).

Figure 8:
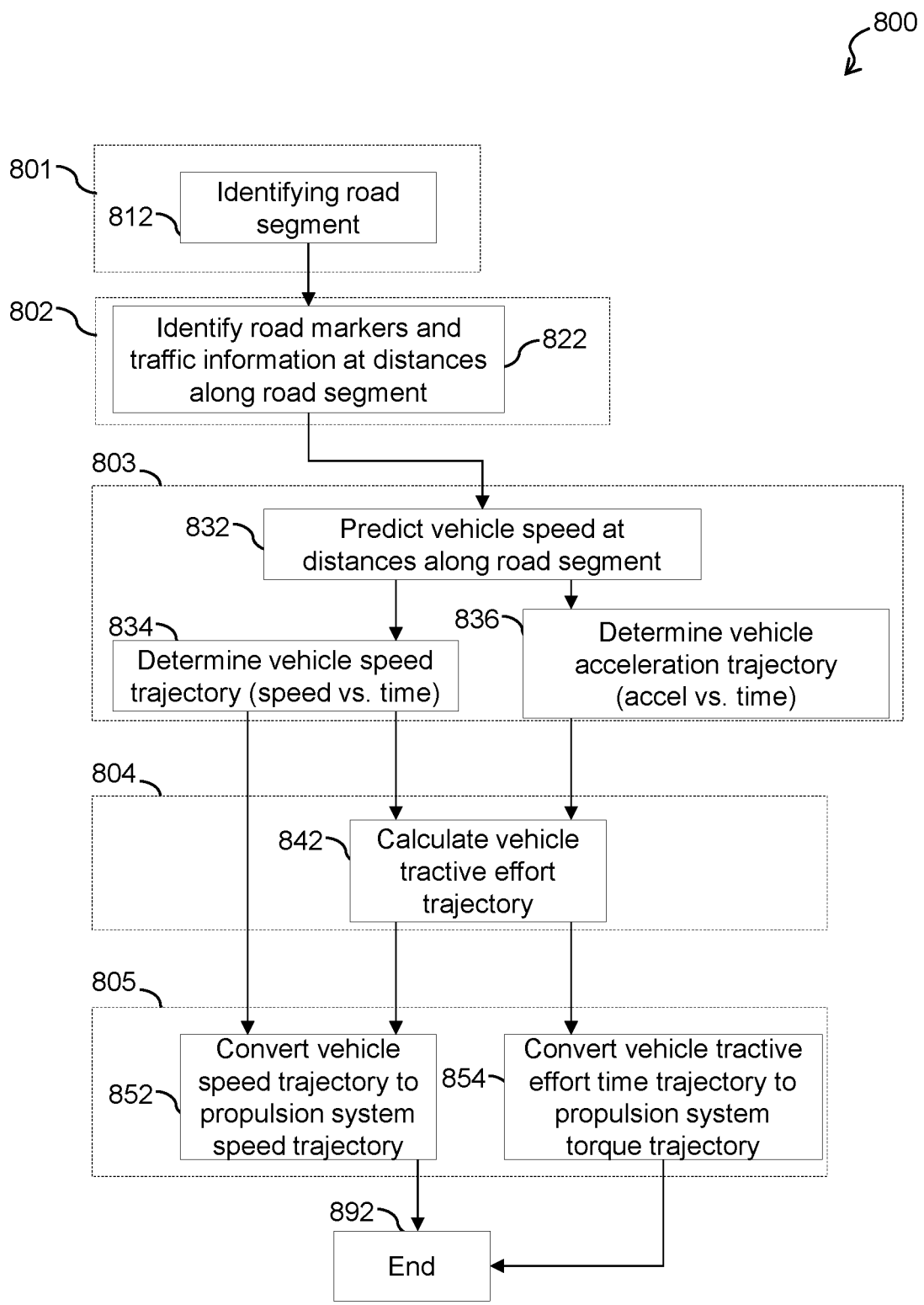
FIG. 8 depicts a process flow according to one or more embodiments.
Figure 9A:
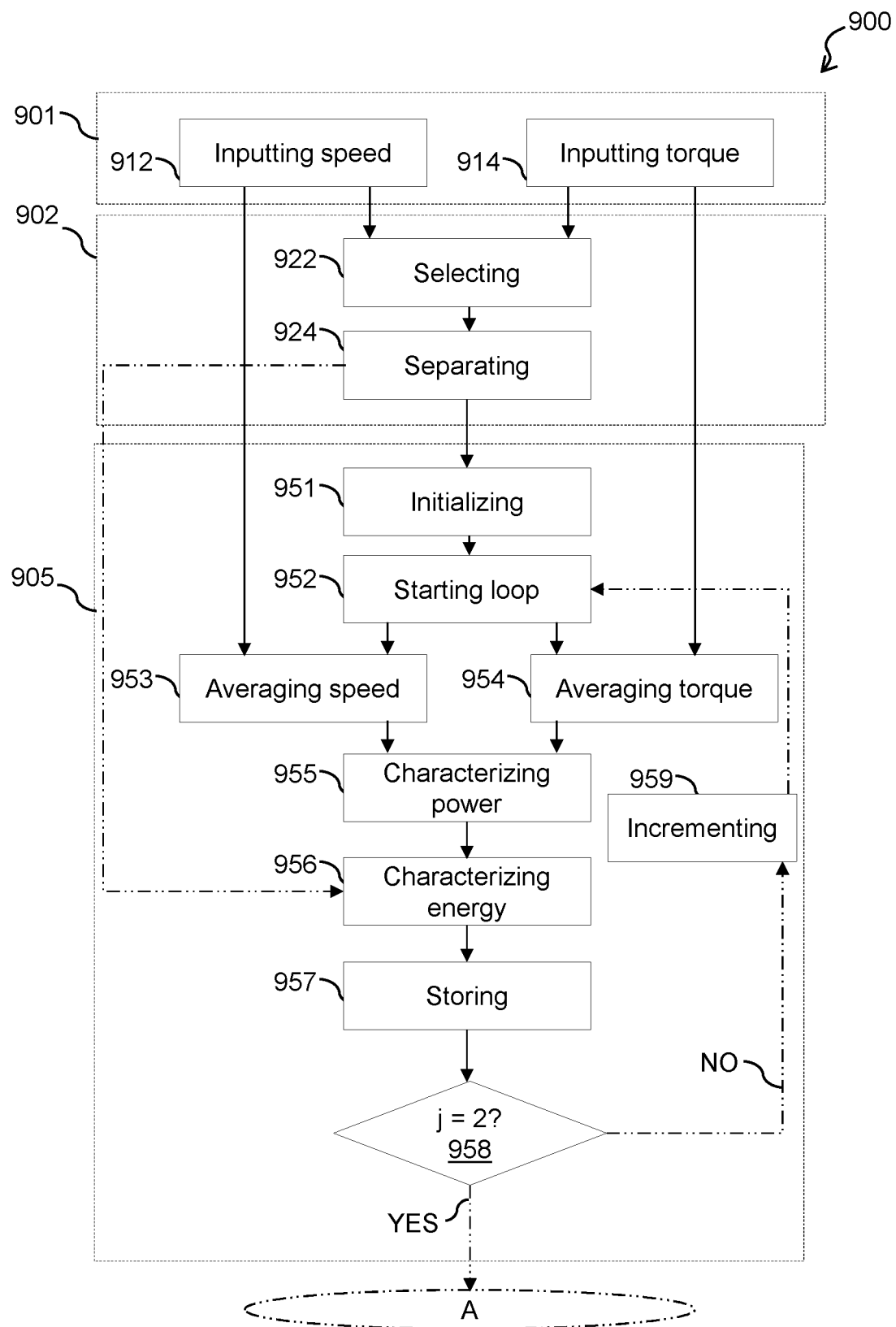
FIG. 9A-9B depict a process flow according to one or more embodiments.
Figure 9B:
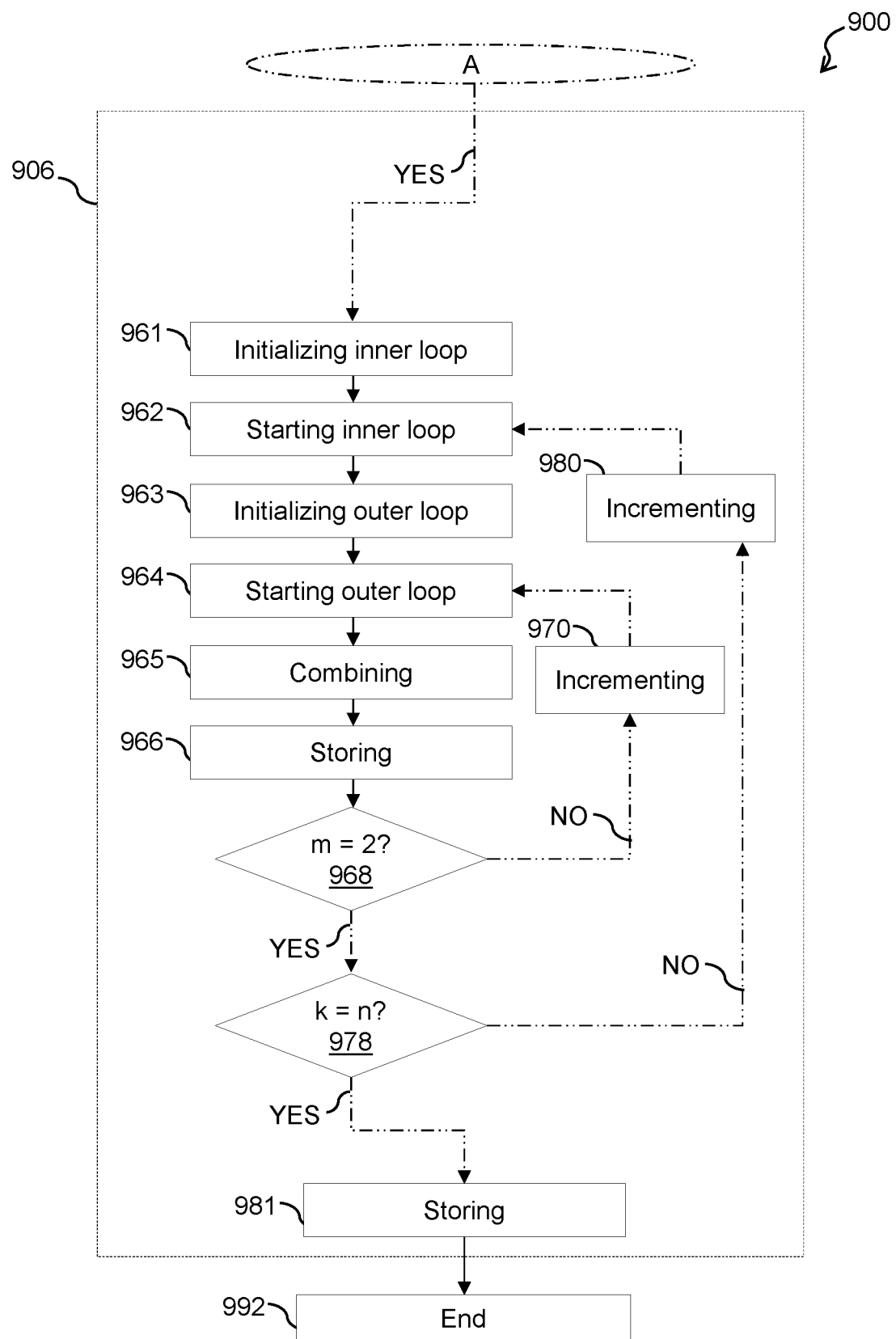

The characterizing of the route segment (e.g., block 735) is now described with respect to FIGS. 8 and 9A-9B. In general, the process flow 800 of FIG. 8, according to one or more embodiments, is a propulsion system speed and torque determination method that receives as inputs the route segment and outputs the propulsion system speed and propulsion system torque as functions of time. Further, the process flow 800 from a high level control perspective loops through a number of operations (e.g., five) on each of the N segments to generate a prediction of the vehicle speed and the vehicle acceleration as a function of time. As shown, the process flow 800 includes a route identification at dashed-block 801, a route characterization at dashed-block 802, a driver and traffic characterization at dashed-block 803, a vehicle characterization at dashed-block 804, and a propulsion system characterization at dashed-block 805. Each of the five operations will be discussed in detail in sections herein.

The route identification operation at dashed-block 801 can be described with respect to block 812. At block 812, the automobile onboard computer system 54N (e.g., the routing engine 58) identifies the road segment (e.g., as described with respect to blocks 731, 733, and 735 of FIG. 7). For instance, the routing engine 58 identifies an entire route. While, at block 702 of FIG. 7 the entire route is quantized into route segments. block 735 identifies an appropriate route segment that needs to be characterized by executing FIGS. 8 and 9A-B in a (continuous) loop through the N segments.

The route characterization operation at dashed-block 802 can be described with respect to block 822. At block 822, identifies road markers and traffic information at specified distances along the route segment. That is, after the route segment has been identified, road markers and traffic information at specified distances along the route segment can be identified (e.g., "Route Characterization"). For example, with respect to the first segment of the three segment example herein, a number of markers are located based on distance along the route segment.

The driver and traffic characterization operation at dashed-block 803 can be divided into blocks 832, 834, and 836. At block 832, the automobile onboard computer system 54N predicts a vehicle speed as a function of route segment distance. The automobile onboard computer system 54N can include wait times with respect to when the vehicle 55 is stopped. At block 834, utilizing the vehicle speed, the automobile onboard computer system 54N determines vehicle speed vs. time (e.g., a vehicle speed trajectory). Further, at block 836, utilizing the vehicle speed, the automobile onboard computer system 54N determines vehicle acceleration vs. time (e.g., a vehicle acceleration trajectory).

The vehicle characterization operation at dashed-block 804 can be described with respect to block 842. Vehicle characterization can include determining vehicle characteristics (e.g., vehicle mass, rolling resistance, aerodynamic drag, etc.) and environmental conditions (e.g., grade and wind). At block 842, the vehicle characteristics and the environmental conditions are used by the automobile onboard computer system 54N to calculate vehicle tractive effort time trajectories required to generate the vehicle speed and vehicle acceleration (e.g., the vehicle speed and acceleration trajectories determined from blocks 834 and 836). The output is then a vehicle tractive effort vs. time (e.g., vehicle tractive effort time trajectories).

The propulsion system characterization operation at dashed-block 805 can be divided into blocks 852 and 854. At block 852, the automobile onboard computer system 54N uses wheel and tire sizing (e.g., and any multiplication through a vehicle differential) to convert the vehicle speed trajectory to propulsion system speed vs. time (e.g., a propulsion speed trajectory or a transmission output speed). At block 854, the automobile onboard computer system 54N uses wheel and tire sizing (e.g., and any multiplication through a vehicle differential) to convert the vehicle tractive effort time trajectories to propulsion system torque vs. time (e.g., a propulsion torque trajectory or a transmission output torque). Then, the process flow 800 proceeds to block 892 and ends.

The process flow 900 of FIGS. 9A-B, according to one or more embodiments, calculates a propulsion system energy characterization given propulsion system output speed and torque trajectories (e.g., a propulsion torque trajectory or a transmission torque). The process flow 900 amounts to calculating the minimum input energy required to drive a route segment. Note that output speed multiplied by output torque yields output power, and a time integration of output power over the route segment yields the output energy required for the route segment. It can further be noted that if there were no propulsion system losses, the input energy can equal the output energy. The process flow 900 also determines how the energy characterization is a function of the specific propulsion system. When the propulsion system is a conventional powertrain, the energy characterization of the process flow 900 is the single value that indicates the minimum fuel energy required to drive the route segment (e.g., which is calculated by using the transmission gear that yields the best engine operating point and best fuel economy throughout the route segment). When the propulsion system is an electric vehicle, the energy characterization of the process flow 900 is the minimum battery energy required to drive the route segment. For hybrid propulsion systems with multiple (e.g., usually two) energy sources, the energy characterization of the process flow 900 indicates a relationship between the multiple energy sources (e.g., fuel and battery energies). More specifically, the process flow 900 indicates the minimum fuel energy required as a function of battery energy by optimizing all propulsion system control degrees of freedom. For example, if the vehicle drove the route segment and maintained battery SoC from beginning to end (e.g., no net change in state of charge), the process flow 900 determines what minimum amount of fuel is consumed. The process flow 900 also repeats at several different changes in battery SoC. The end desired result is an energy characterization curve, as described herein.

The process flow 900 includes a propulsion system characterization at dashed-block 901, a route segment micro binary quantization at dashed-block 902, a route segment micro characterization at dashed-block 905, and a route segment micro combination at dashed-block 906. These operations will be discussed in detail in sections herein.

The propulsion system characterization operation at dashed-block 901 can be divided into blocks 912 and 914. At block 912, the automobile onboard computer system 54N receives the propulsion system speed vs. time (e.g., a propulsion speed trajectory or a transmission output speed). Note that the propulsion speed trajectory or the transmission output speed can be a standalone function from block 852 is part of the broader block 735 of FIG. 7. At block 914, the automobile onboard computer system 54N receives the propulsion system torque vs. time (e.g., a propulsion torque trajectory or a transmission output torque from block 854).

The route segment micro binary quantization operation at dashed-block 902 can be divided into blocks 922 and 924. At block 922, the route segment binary quantization operation chooses a number of separate time intervals (e.g., 2^r time intervals). At block 924, the route segment binary quantization operation separates the total time into the number of separate time intervals.

The route segment micro characterization operation at dashed-block 905 begins at block 951, where the automobile onboard computer system 54N initializes a loop interval counter (e.g., f=1). At block 952, the automobile onboard computer system 54N calls a function ("Route Micro Segment Characterization Loop f") to characterizes the separate time intervals. At block 953, the automobile onboard computer system 54N determines an average propulsion system speed during that time interval (e.g., f-th interval) using the propulsion speed trajectory from block 912. At block 954, the automobile onboard computer system 54N determines an average propulsion system torque during that time interval (e.g., f-th interval) using the propulsion torque trajectory from block 914. At block 955, the automobile onboard computer system 54N characterizes the propulsion system power at a single propulsion speed and propulsion torque (using the average propulsion system speed and the average propulsion system torque of blocks 953 and 954, respectively). At block 956, the automobile onboard computer system 54N characterizes the propulsion system energy (using the separate time intervals and the single propulsion speed and propulsion torque of blocks 924 and 955, respectively). In this regard, the automobile onboard computer system 54N multiplies the power by the time interval.

At block 957, the automobile onboard computer system 54N stores the route micro segment characterization (e.g., [0, f]). At decision block 958, the automobile onboard computer system 54N determines if a last time interval has been reached by comparing the loop interval counter to the selected number of time intervals (e.g., does m=2^r). If the last time interval has not been reached, the process flow 900 proceeds to block 959, where the loop interval counter is incremented (e.g., f=f+1). Then, the process flow 900 loops back to block 952. If the last time interval has been reached, the process flow 900 proceeds to block 961 of FIG. 9B, as represented by the dot-dashed-circle A.

The route segment micro characterization operation at dashed-block 906 begins at block 961, where the automobile onboard computer system 54N initializes an outer loop counter (e.g., k=1). At block 962, the automobile onboard computer system 54N calls a function ("Binary Characterization Outer Loop k"). At block 963, the automobile onboard computer system 54N initializes an inner loop counter (e.g., m=1). At block 964, the automobile onboard computer system 54N calls a function ("Binary Characterization Inner Loop m").

At block 965, the automobile onboard computer system 54N combines the characterization (e.g., [k−1, 2m−1] and [k−1, 2m]). At block 966, the automobile onboard computer system 54N stores the combined characterization (e.g., [k, m]). At decision block 968, the automobile onboard computer system 54N determines if the inner loop is complete (e.g., does m=2^(t−k)). If the inner loop is not complete, the process flow 900 proceeds to block 970, where the inner loop counter is incremented (e.g., m=m+1). Then, the process flow 900 loops back to block 964. If the inner loop is complete, the process flow 900 proceeds to decision block 978.

At decision block 978, the automobile onboard computer system 54N determines if the outer loop is complete (e.g., does k=t). If the outer loop is not complete, the process flow 900 proceeds to block 980, where the outer loop counter is incremented (e.g., k=k+1). Then, the process flow 900 loops back to block 962. If the outer loop is complete, the process flow 900 proceeds to block 981. At block 981, the automobile onboard computer system 54N stores the segment characterization (e.g., [n, 1]). Then, the process flow 900 proceeds to block 992 and ends.

Returning to dashed-block 705 of the process flow of FIG. 7, the candidate route characterization at dashed-block 705 can be divided into blocks 753 and 755. At block 753, the automobile onboard computer system 54N performs/receives the route segment characterizations for each of the future candidate routes. At block 755, the automobile onboard computer system 54N combines, on a future candidate route basis, the route segment characterizations to produce an estimated energy for each future candidate route.

At decision block 758, the process flow 700 determines if all future candidate routes have been considered. If all future candidate routes have been considered, the process flow 700 proceeds to block 706 (as indicated by the YES arrow). If all future candidate routes have not been considered, the process flow 700 return to block 702 (as indicated by the NO arrow).

The optimized route selection at dashed-block 706 can be divided into blocks 764 and 768. At block 764, the automobile onboard computer system 54N selects an optimal route from the candidate routes to minimize energy. At block 768, the optimal route is communicated and/or executed by the vehicle 55 (e.g., communicated to a driver if a driver is in control; executed by a vehicle if the vehicle is controlled autonomously).

At decision block 770, the automobile onboard computer system 54N determines whether the final destination is reached. If the final destination has not been reached, the process flow 700 proceeds to block 715 (as indicated by the NO arrow). Note that the process flow 700 is continually reconsidering the optimal route along the whole drive, and adjusts the route based on changing conditions including traffic or changes in current location (including deviations) or final destination. If the final destination has been reached, the process flow 700 proceeds to block 792 and ends (as indicated by the YES arrow).

Technical effects and benefits of the disclosed embodiments include, but are not limited to providing an optimized route that minimizes energy consumption (e.g., total fuel consumption and/or battery energy consumption for electric vehicles) for a vehicle traversing that route. Accordingly, when traversing an optimized route, a propulsion control system 59 of a vehicle can minimize fuel consumption for the vehicle while charging or discharging the battery to maintain a desired state of charge.

Accordingly, the embodiments disclosed herein describe a system that characterizes vehicle route information and driver information to determine the optimal operation a vehicle and propulsion which could be consumed and strategically leveraged by an embedded propulsion system control system. The system can therefore make real-time embedded propulsion control system decisions, which can be used to traverse route segments of a navigable route. The system can consider large amounts of map data, driver specific data and vehicle information to generate smaller sets of data that can be used to direct, relevant and actionable operation of available propulsion resources to traverse the navigable route.

Embodiments of the present disclosure can overcome typical solutions for routing vehicles and propulsion management, which merely determines a route that attempts to maintain a current state of charge for a battery by considering current and future opportunities to charge the battery, as well as fuel expenditures along the route. By considering the current and future opportunities to charge the battery and fuel expenditures as well as other considerations, such as, map data and driver specific data, an optimized route can be calculated and provided to the user which causes a more efficient use of the battery while traversing the route.

The system can include an efficient communication interface structure that can communicates with a propulsion system control of a vehicle in order to control the propulsion control system thereby providing real-time decisions on fuel vs. battery power utilization. The communication interface can recognize a distinction between near-term fuel/battery energy characteristics for a traversed route versus long-term characteristics for the traversed route. The system can cause a "macro-level" path optimization to occur along the route, including a real-time adaptation along the route.

It is understood that although the embodiments are described as being implemented on a traditional processing system, the embodiments are capable of being implemented in conjunction with any other type of computing environment now known or later developed. For example, the present techniques can be implemented using cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. It should be appreciated that the computing environment 50 that is associated with a system for geo-location based transmission resource allocation for vehicle sensors can be implemented in a cloud computing environment, and cell length, width and geo-location information can be stored locally and/or remotely, such as in the cloud computing environment.

Technical effects and benefits of the disclosed embodiments include, but are not limited to providing a full path optimization for a route which minimizes total fuel consumption for a vehicle (e.g., energy consumption for an electric vehicle) traversing the route. Accordingly, when traversing an optimized route, a propulsion control system of a vehicle can minimize fuel consumption (e.g., pure energy consumption for an electric vehicle) for the vehicle while charging or discharging the battery to maintain a desired state of charge.

The present disclosure may be a system, a method, and/or a computer readable storage medium. The computer readable storage medium may include computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a mechanically encoded device and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for determining a route using route segment characterizations, the method comprising:
   receiving, by a processor, a destination;
   determining, by the processor, one or more routes to the destination from a first location;
   dividing, by the processor, each of the one or more routes into one or more route segments;
   characterizing, by the processor, each of the one or more route segments according to propulsion resources available to a vehicle based on a fuel energy versus a battery energy curve, wherein characterizing each of the one or more route segments comprises utilization of driver specific data including data related to driving styles;
   providing, by the processor, an optimized route from the one or more routes based on the characterization of the one or more route segments, wherein the optimized route comprises the one of the one or more routes achieving minimum fuel consumption and a target battery state of charge;
   determining, by the processor, when adjustments to one or more route segment characterizations are needed due to a change in driving style; and
   performing, by the processor, a re-optimization of the optimized route when an adjustment to one or more route segment characterizations is needed.

2. The method of claim 1, further comprising displaying the optimized route on a display of the vehicle.

3. The method of claim 1, wherein the optimized route is provided based on near-term energy characteristics and long-term energy characteristics.

4. The method of claim 1, wherein a routing engine utilizes segment topography associated with each of the one or more route segments.

5. The method of claim 1, wherein a propulsion control system utilizes an estimated energy associated with the optimized route to control an operation of the propulsion resources available to the vehicle while traversing the optimized route.

6. A system for determining a route using route segment characterizations, the system comprising:
   one or more vehicles; and
   one or more servers, wherein each server comprises:
      a memory; and
      a processor coupled to the memory, wherein the processor is operable to:
         receive a destination;
         determine one or more routes to the destination from a first location;
         divide each of the one or more routes into one or more route segments;
         characterize each of the one or more route segments according to propulsion resources available to a vehicle based on a fuel energy versus a battery energy curve, wherein characterizing each of the one or more route segments comprises utilization of driver specific data including data related to driving styles;
         provide an optimized route from the one or more routes based on the characterization of the one or more route segments, wherein the optimized route comprises the one of the one or more routes achieving minimum fuel consumption and a target battery state of charge;
         determine when adjustments to one or more route segment characterizations are needed due to a change in driving style; and
         perform a re-optimization of the optimized route when an adjustment to one or more route segment characterizations is needed.

7. The system of claim 6, wherein the processor is further operable to display the optimized route on a display of the vehicle.

8. The system of claim 6, wherein the optimized route is provided based on near-term energy characteristics and long-term energy characteristics.

9. The system of claim 6, wherein a routing engine utilizes segment topography associated with each of the one or more route segments.

10. The system of claim 6, wherein a propulsion control system utilizes an estimated energy associated with the optimized route to control an operation of the propulsion resources available to the vehicle while traversing the optimized route.

11. A non-transitory computer readable storage medium having program instructions embodied therewith, the program instructions readable by a processor to cause the processor to perform:
    receiving a destination;
    determining one or more routes to the destination from a first location;
    dividing each of the one or more routes into one or more route segments;
    characterizing each of the one or more route segments according to propulsion resources available to a vehicle based on a fuel energy versus a battery energy curve, wherein characterizing each of the one or more route segments comprises utilization of driver specific data including data related to driving styles;
    providing an optimized route from the one or more routes based on the characterization of the one or more route segments, wherein the optimized route comprises the one of the one or more routes achieving minimum fuel consumption and a target battery state of charge;
    determining when adjustments to one or more route segment characterizations are needed due to a change in driving style; and
    performing a re-optimization of the optimized route when an adjustment to one or more route segment characterizations is needed.

12. The computer readable storage medium of claim 11, the program instructions being readable by the processor to cause displaying the optimized route on a display of the vehicle.

13. The computer readable storage medium of claim 11, wherein the optimized route is provided based on near-term energy characteristics and long-term energy characteristics.

14. The computer readable storage medium of claim 11, wherein a routing engine utilizes segment topography associated with each of the one or more route segments.

15. The computer readable storage medium of claim 11, wherein a propulsion control system utilizes an estimated energy associated with the optimized route to control an operation of the propulsion resources available to the vehicle while traversing the optimized route.

\* \* \* \* \*